Aug. 15, 1933.    R. HENRY    1,922,765
SPRING CONNECTION
Original Filed July 12, 1929    3 Sheets-Sheet 2

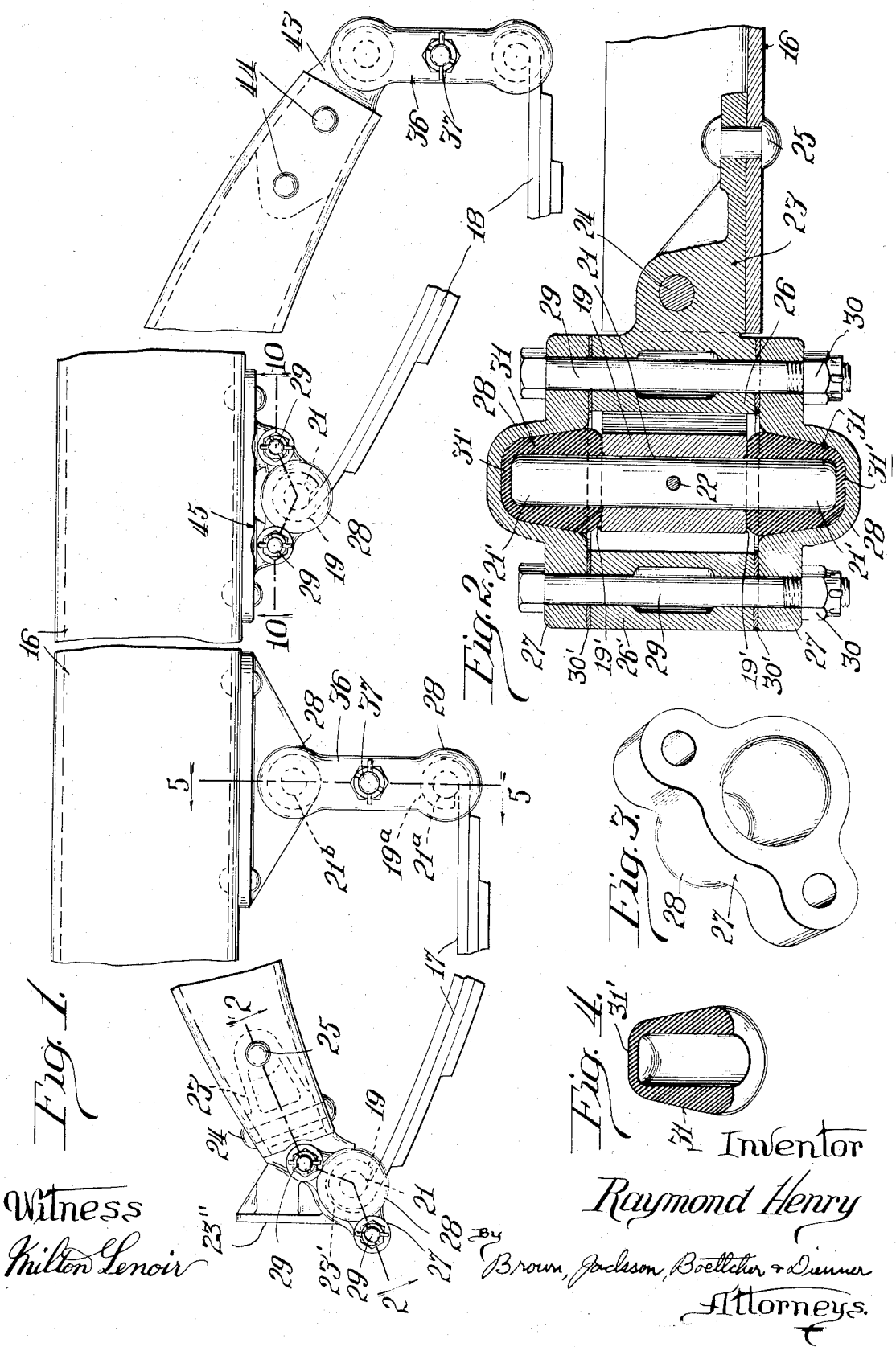

Witness
Milton Lenoir

Inventor
Raymond Henry
By Brown, Jackson, Boettcher & Dienner
Attorneys.

Aug. 15, 1933.                R. HENRY                1,922,765
                         SPRING CONNECTION
                   Original Filed July 12, 1929    3 Sheets-Sheet 3
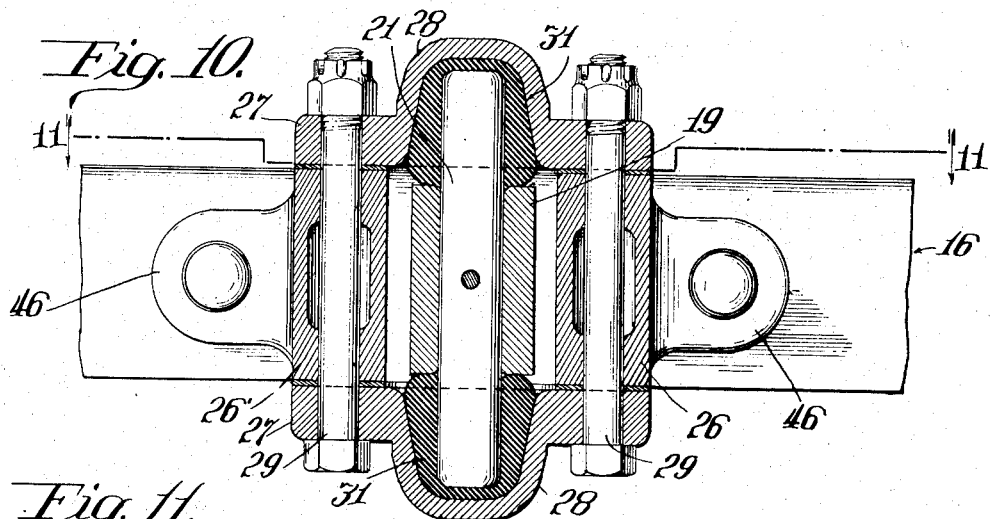
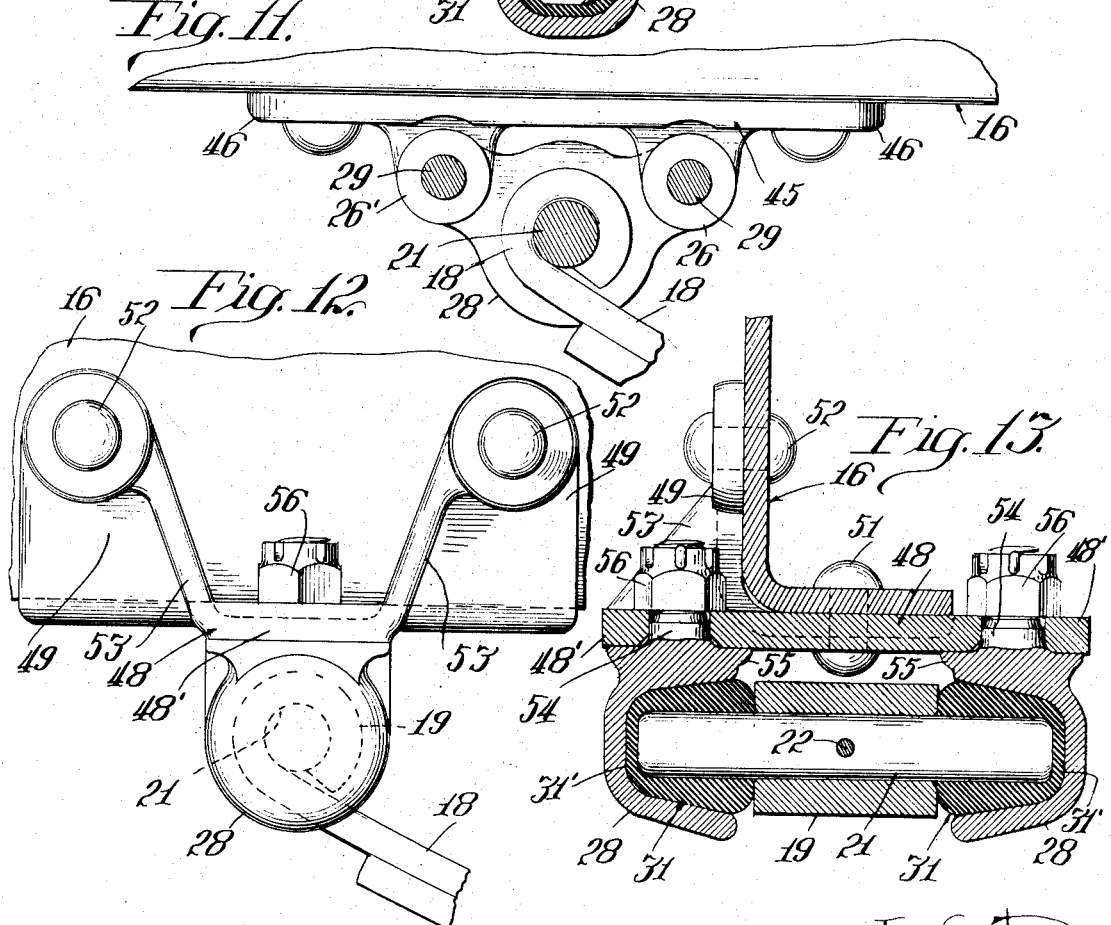
Inventor
Raymond Henry
By Brown, Jackson, Boettcher & Drenner
Attorneys
Witness
Milton Lenoir Patented Aug. 15, 1933

1,922,765

UNITED STATES PATENT OFFICE 1,922,765

SPRING CONNECTION

Raymond Henry, Moline, Ill., assignor to Henry Manufacturing Co., Davenport, Iowa, a Corporation of Iowa Application July 12, 1929. Serial No. 377,758
Renewed May 29, 1933

3 Claims. (Cl. 267—54)

The present invention relates to oscillating joint connections, such for example as the spring shackle connections commonly used on automobiles.

The present connection is of the general type employing flexible or elastic members, composed for example of rubber, which are interposed between the oscillating parts of the joint so that the relative oscillating movement between said parts is sustained by flexure of the elastic members. Such construction has the general characteristics of minimizing wear, eliminating rattle between the parts, and avoiding the necessity of lubrication.

The present construction embodys improvements over all prior constructions with which I am familiar, residing particularly in the fact that the elastic members are mounted directly in the shackle links or at the ends of the transverse pivot pins, and also residing in the manner in which these elastic members are placed under compression. This construction has the further advantages of being capable of quick and easy installation on the automobile, and of being comparatively cheap to manufacture.

Other objects and advantages of my invention will appear in the following description of a preferred embodiment thereof. In the accompanying drawings illustrating such embodiment:

Figure 1 is a fragmentary side elevation of the chassis frame of an automobile, some parts being broken away to permit of illustration on a larger scale of the parts in which my invention is incorporated;

Figure 2 is an approximately horizontal sectional view taken substantially on the plane of the line 2—2 of Figure 1;

Figure 3 is a perspective view of one of the end caps employed in the form illustrated in Figure 2;

Figure 4 is a sectional view in perspective of one of the resilient members;

Figure 10 is an approximately horizontal sectional view taken on the plane of the line 10—10 of Figure 1 and looking upwardly;

Figure 11 is a vertical sectional view through this form of spring connection, taken on the plane of the line 11—11 of Figure 10;

Figure 12 is a side elevational view of a modified form of spring connection; and Figure 13 is a vertical axial sectional view of this latter construction.

Figure 5:
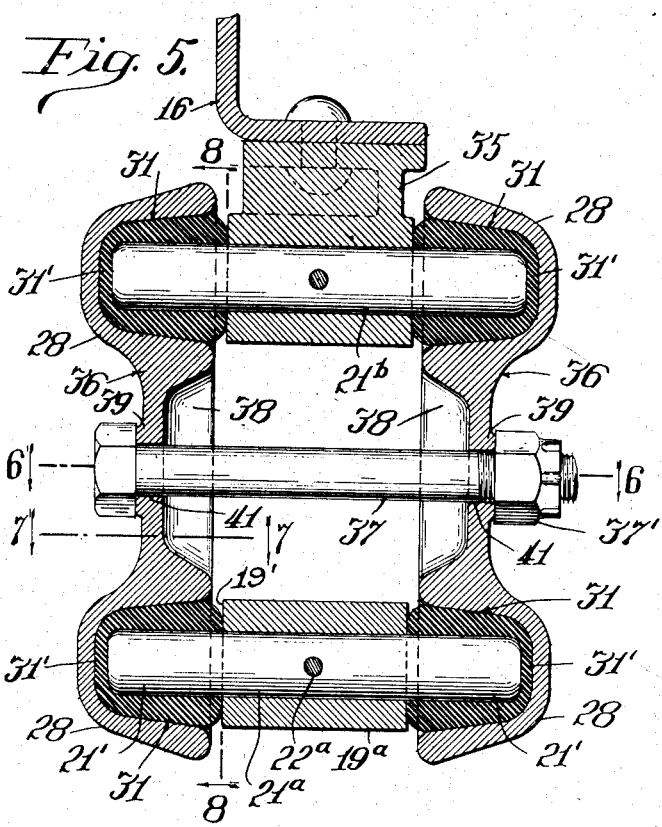
Figure 5 is a substantially vertical sectional view taken approximately on the plane of the line 5—5 of Figure 1.
Figure 8:
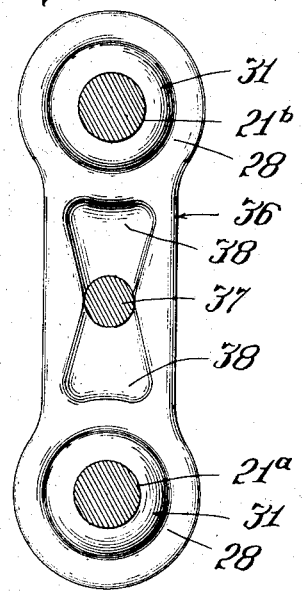
Figure 8 is a vertical sectional view through this spring shackle connection taken on the plane of the line 8—8 of Figure 5 and illustrating the inner side of one of the shackle links.
Figure 6:
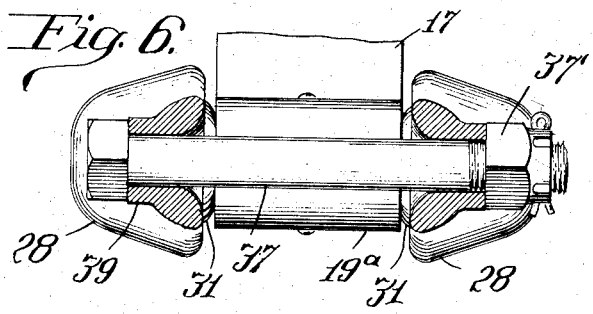
Figure 6 is a transverse sectional view taken on the plane of the line 6—6 of Figure 5.
Figure 9:
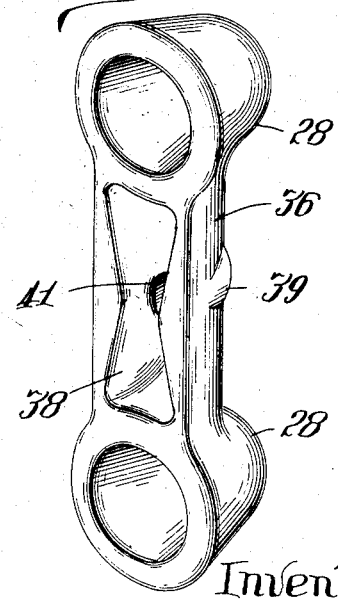
Figure 9 is a perspective view of one of these shackle links, as viewed from the inner side thereof.

Referring to the drawings, 16 indicates one of the side members of an automobile frame, 17 one of the usual front springs, and 18 one of the rear springs. According to the most commonly followed practice of connecting these springs to the frame, the front end of each front spring is usually pivotally connected directly to the front end of the automobile frame by providing the spring with a cylindrical bearing in the form of an eye which is carried on a bolt that passes through openings in the front end of the frame, the rear end of the front spring being connected to the frame by a pair of links and bolts that constitute a shackle connection. In the case of the rear springs a similar arrangement is usually employed, the front end of each rear spring being pivotally connected directly with the frame while its rear end is connected with the rear end of the frame by shackle links. In such prior constructions, the connecting bolts constitute pivots on which the parts bear and turn, which arrangement involves a number of metal-to-metal bearing surfaces all of which must be kept well lubricated, particularly as they are subject to accumulation of dust, which is apt to cause wear. If the parts become dry they squeak more or less, and when the shackles wear they rattle. To prevent too rapid deterioration of the connections it has heretofore been found necessary in such prior constructions to use hardened bolts, and to machine or face the inner and outer surfaces of the castings in which the bolts are fitted, all of which increases the manufacturing costs.

The present invention overcomes all of these difficulties by providing one of the oscillatory parts of each joint with laterally projecting studs, and providing the other oscillatory part of the joint with sockets which engage over the studs, and disposing elastic bushings in these sockets around the studs to take the relative oscillation between the studs and sockets by flexure of the bushing material. Referring now to one particular form which this connection may assume for connecting the front end of the front spring 17 to the automobile frame, it will be seen from Figures 1 and 2 that the front end of the spring 17 is provided with an eye 19 either constructed as a curled end of one of the spring leaves, or constructed in the form of a separate member secured to the end of the spring. Non-rotatively mounted in the eye 19 is an axial pin 21, which is rigidly held within the eye either by a drive fit or by extending a keying pin 22 through the eye 19 and pin 21. The ends of the axial pin 21 project laterally beyond the ends of the eye 19 to provide laterally projecting studs 21', 21' about the axis of which the part 19 of the joint oscillates in the oscillatory movement of the joint. The other part of the joint comprises a bracket 23 suitably secured by rivets 24 and 25 within the front end of the channel frame member 16 and constituting a spring horn for connecting with the front end of the spring 17. Formed integral with the bracket 23 are two apertured bosses 26 and 26' disposed on opposite sides of the spring eye 19, the bracket 23 comprising a web proportion 23' arching over the upper portion of the eye 19 for supporting the outer boss 26'. Disposed at opposite ends of these bosses are two duplicate cap members 27, 27 in which are formed relatively deep sockets 28, 28 for receiving the stud ends 21', 21'. Bolts 29 pass through holes in these socket members 27 and through the apertured bosses 26, 26' for drawing the socket members together over the studs 21'. Each bracket 23 may be formed with a vertically extending integral plate portion 23'' serving as an attaching surface for mounting a bumper.

The sockets 28 are formed with closed outer ends, and fitted into these sockets are elastic thimbles or bushings 31 for receiving the studs 21', such bushings being preferably compounded of rubber and fabric. The outer end of each busing is preferably closed to interpose a compressible end wall 31' between the end of the stud 21' and the closed end of the socket 28. The socket 28 is preferably tapered and the bushing is correspondingly tapered to fit snugly therein. Each end of the spring eye 19 is spaced from the inner face of the adjacent socket member 27 and the elastic bushing 31 extends from the socket 28 into engagement with the end of the spring eye. By virtue of the tapered formation of the bushing 31 its inner or base end is of considerable sectional thickness where it bears against the end of the spring eye and in the intervening space between the spring eye and the socket member 27. The increased sectional thickness of the bushing at this point is of advantage for sustaining relative side thrust between the automobile frame and spring, represented, as end thrust between the spring eye 19 and the sockets 28.

In assembling the construction the bolts 29 are drawn up firmly through the nuts 30 to a degree sufficient to place the bushings 31 under relatively heavy compression. The parts are preferably so proportioned that this desired degree of compression will be obtained when the two cap or plate members 27 engage the opposite ends of the bosses 26, 26'. If desired, washers 30' may be placed at the opposite ends of the bolts so that by removing or replacing these washers the compression can be increased or decreased. As an alternative construction one of the cap or plate members 27 may be made integral with the ends of the bosses 26, 26'. The endwise compression of the bushings establishes a firm frictional engagement thereof with the sockets 28, and with the studs 21 and the ends of the spring eye 19. This frictional engagement is sufficient to prevent slippage of the bushings on these surfaces within the ordinary range of oscillatory movement between the two relatively movable parts of the joint so that this oscillating movement takes place as a flexure within the body of each bushing. Axial thrust between the studs 21' and the sockets 28 is borne by the end walls 31' of the bushings and by the compression built up between the ends of the spring eye 19 and the enlarged ends of the bushings. The ends of the spring eye 19 form annular shoulders 19' for transmitting end thrust in either direction to the enlarged base ends of the bushings.

Figures 5 to 9 inclusive illustrate my invention embodied in the shackle links for connecting the rear ends of the front springs to the frame, a generally similar arrangement being employed for connecting the rear ends of the rear springs to the frame. In this arrangement the rear end of the spring 19 is provided with a similar spring eye 19a in which the axial pin 21a is rigidly secured with its ends projecting therefrom to form the studs 21', as previously described.

Figure 7:
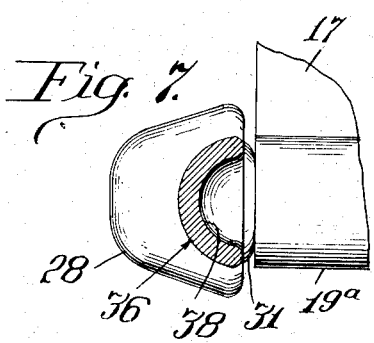
Figure 7 is a detail sectional view through one of the side links, taken on the plane of the line 7—7 of Figure 5.

The upper part of this shackle connection comprises a similar pin 21b which is rigidly secured in a suitable bracekt 35 secured to the frame channel 16. Two duplicate shackle links 36, 36 engage over the projecting ends of the pins 21a and 21b. The opposite ends of each link are formed with sockets 28 which are generally similar to those previously described, having their outer ends closed and having their bores tapered for engaging over the tapered bushings 31 which are interposed between the sockets and the stud ends of the pins 21a and 21b. The two shackle links are drawn together, to compress the upper and lower pairs of bushings, by a transverse bolt 37 extending through the shackle links substantially midway the pins 21a and 21b. It is desirable that these links be of relatively light weight and still be of sufficient strength to withstand the compression pressures of the bolt 37. Figures 6 to 9 inclusive illustrate one sectional form of link having these characteristics. The intermediate bar portion of each link is of arched cross-section as illustrated in Figure 7, with a recess 38 extending longitudinally of the link along the inner side thereof. Midway of the link the side walls of this U-shaped recess are thickened and extended outwardly to form the apertured boss 39 for receiving the bolt 37. As will be seen from Figures 8 and 9, the thickening of the side walls of the recess 38 in the horizontal plane of the bolt hole 41 increases the strength of the link at the point where the bending stress is greatest.

The tightening of the nut 37' on the bolt 37 simultaneously compresses all four bushings 31 and exerts an equalized or distributed pressure on these bushings so that all are compressed to the same degree. The sockets 28 and the bushings 31 are so proportioned that with the bushings under the desired degree of compression the inner ends of the sockets will be spaced from the adjacent ends of the spring eye 19a and bracket 35, whereby there will be no metal-to-metal contact between these parts and axial thrust will be borne by the compression of the bushings, as described of the preceding embodiment. The oscillatory movement at both joints of the shackle is sustained by flexing of the bushing material.

It will hence be seen that in this shackle construction the two shackle links are insulated entirely from the frame and spring parts by the interposed elastic bushings so that there is no possibility of frictional wear and rattle. Such construction also avoids the necessity of machined parts and requires only the single bolt 37. This form of assembly is preferably employed at the rear ends of both the front and rear springs, and it may also be employed at the front ends of the rear springs when the drive is transmitted through a torque tube or through radius rods, as is well understood by those skilled in the art. In the case of assembly at the rear ends of the rear springs, the pin 21b will be carried by a bracket or spring horn 43 (Figure 1) which is secured by rivets 44 within the end of the frame channel, such bracket having a suitable eye or boss for supporting the pin 21b in substantially the same relation as in the case of the bracket 35 of Figure 5.

Figures 10 and 11 illustrate my invention embodied in a hanger bracket for connecting the front end of the rear spring 18 with the frame channel 16. This construction is generally similar to the construction of bracket illustrated in Figure 2. It comprises a main plate portion 45 having extending lugs or ears 46 for riveting to the bottom of the frame channel 16. Formed integral with this plate portion and disposed downwardly therefrom are the apertured bosses 26, 26' which receive the bolts 29. The front eye 19 of the rear spring extends into the space between the two bosses 26, 26' and has its pin 21 supported in bushings 31 carried in the socketed end caps 27. The construction and assembly is hence virtually the same as in Figure 2, such permitting of the interchange of parts between the hanger brackets for the front springs and the hanger brackets for the rear springs.

Figures 12 and 13 illustrate a modified construction which may be employed for connecting the front end of the rear spring with the frame, although it may also be employed for connecting the front end of the front spring with the frame or may even be employed with a shackle link assembly. Secured to the frame member 16 is a bracket comprising a horizontal plate portion 48 having upwardly extending attaching lugs 49 adjacent to its ends (Figure 12). The plate portion 48 is preferably secured to the lower flange of the frame member by one or more rivets 51, and the lugs 49 are secured to the vertical web of the frame member by the rivets 52.

The horizontal portion 48 projects laterally from each side of the frame channel 16 to form the extending shelf portions 48' in the center of the bracket, and the outer shelf portion is joined with the lug portions 49 by the reinforcing ribs 53. These shelf portions are apertured to receive studs 54 extending upwardly from socket members 28. Each socket is formed with a horizontal flange 55 at the base of the stud 54 for engaging the under side of the bracket plate 48, being drawn up into rigid engagement therewith by the nuts 56 screwing over the upper ends of the studs 54. The sockets 28 support the bushings 31 which receive the pin 21 carried by the spring eye 19. In assembling this construction the bushings 31 may be placed under compression by squeezing the sockets 28 together over the stud ends 21' and then inserting the studs 54 up through the holes in the bracket plate 48 while the sockets are thus held squeezed together; or the studs 54 may be inserted diagonally up through these holes and then drawn up tight by the nuts 56 so that the sockets in being straightened into aligned relation will compress the bushings.

It will be seen from the foregoing that the fundamental elements, consisting of the oppositely extending studs 21', the sockets 28 and the elastic bushings 31, are universally adaptable to all types of connections for connecting either end of either spring with the frame.

The construction shown is preferred, but numerous modifications and rearrangements may be made therein without departing from the essence of the invention. For example, while it is preferable to have some of the side thrust borne by contact of the end of the stud or trunnion pin 21 with the closed end wall 31' of the bushing it will be understood that, if desired, all of this side thrust might be transmitted to the bushing through the shoulder 19', in which case pressure engagement between the end of the pin and the end of the socket through the wall 31' of the bushing could be dispensed with. As previously remarked, the tapering form of the bushing disposes a considerable sectional thickness thereof in position to transmit end thrust from the shoulder 19' to the tapering walls of the socket, and this considerable sectional thickness also prevents any objectionable outward bulging of the bushing in the clearance space between said shoulder and the end of the socket. Preferably the bushing is compounded of rubber and shredded fabric, such giving it the desired resiliency to carry the oscillations by flexure and also to absorb to a large extent any vibrations transmitted through the joint, while still retaining sufficient body to withstand the compression under which the bushing is retained.

While my invention is probably of greatest utility in the above described embodiment of a spring connection for vehicles, it will be understood that the general principle can also be embodied in other joints and connections within the scope of the invention.

I claim:

1. A connection of the class described comprising two members adapted to have relative oscillatory movement, studs carried by one of said members and projecting therefrom substantially in axial alignment, a pair of independent socket units adapted to be carried by the other member with the sockets thereof extending over said studs, resilient bushings having closed outer ends seated in said sockets and engaging over said studs, threaded studs extending from said socket units and adapted to pass through holes in the latter oscillatory member, and nuts engaging over said threaded studs for securing, said socket units to said latter member.

2. A connection of the class described comprising two members adapted to have relatively oscillatory movement, one of said members having a looped end, studs extending therefrom in substantially axial alignment, a pair of independent cup-shaped sockets adapted to receive said studs, stud means integral with each of said sockets and extending through openings in the latter oscillatory member, nuts engaging over said studs for securing them to said member, and resilient lining means in said sockets engaging over the studs of said first oscillatory member.

3. A connection of the class described comprising two members adapted to have relatively oscillatory movement, one of said members having a looped end, studs extending therefrom in substantially axial alignment, a pair of independent cup-shaped sockets adapted to receive said studs, stud means integral with each of said sockets and extending through openings in the latter oscillatory member, said sockets being provided with bearing surfaces engaging the lower surface of said member, nuts engaging over said studs for securing them to said member, and resilient lining means in said sockets engaging over the studs of said first oscillatory member.

RAYMOND HENRY.